(12) United States Patent  
Miyakoshi et al.

(10) Patent No.: US 8,022,985 B2  
(45) Date of Patent: Sep. 20, 2011

(54) VEHICLE-MOUNTED IMAGING DEVICE

(75) Inventors: Ryuichi Miyakoshi, Osaka (JP); Kazuyuki Inokuma, Kyoto (JP); Toshiya Fujii, Shiga (JP)

(73) Assignee: Panasonic Corporation, Osaka (JP)

( * ) Notice: Subject to any disclaimer, the term of this patent is extended or adjusted under 35 U.S.C. 154(b) by 862 days.

(21) Appl. No.: 12/066,472

(22) PCT Filed: Sep. 29, 2006

(86) PCT No.: PCT/JP2006/319436  
§ 371 (c)(1),  
(2), (4) Date: Mar. 11, 2008

(87) PCT Pub. No.: WO2007/040170  
PCT Pub. Date: Apr. 12, 2007

(65) Prior Publication Data  
US 2009/0128626 A1 May 21, 2009

(30) Foreign Application Priority Data  
Oct. 4, 2005 (JP) ................................. 2005-290782

(51) Int. Cl.  
*H04N 7/18* (2006.01)  
*G06F 15/16* (2006.01)

(52) U.S. Cl. ........................................ 348/118; 348/117  
(58) Field of Classification Search ........... 348/113–118  
See application file for complete search history.

(56) References Cited

U.S. PATENT DOCUMENTS

| 5,523,811 | A |  | 6/1996 | Wada et al. |
| 5,710,872 | A | * | 1/1998 | Takahashi et al. ............. 358/1.9 |
| 6,337,692 | B1 | * | 1/2002 | Rai et al. ........................ 345/594 |
| 7,663,668 | B2 | * | 2/2010 | Kuno et al. ................. 348/222.1 |
| 7,852,388 | B2 | * | 12/2010 | Shimizu et al. ............... 348/272 |
| 2005/0185839 | A1 | * | 8/2005 | Matsubara ..................... 382/167 |

FOREIGN PATENT DOCUMENTS

| JP | 57-100404 | 6/1982 |
| JP | 2000-299875 | 10/2000 |
| JP | 2005-260675 | 9/2005 |

* cited by examiner

*Primary Examiner* — Zarni Maung  
(74) *Attorney, Agent, or Firm* — McDermott Will & Emery LLP

(57) ABSTRACT

Color signals that have passed through a multilayer film filter and been photoelectrically converted are inputted into an image processing LSI. A color signal processing section of the image processing LSI corrects the color signals on a color matrix. The color matrix is divided into a plurality of regions corresponding to the color signals, and the correction is made for each of the regions.

7 Claims, 11 Drawing Sheets

305
304
306

VEHICLE-MOUNTED IMAGING DEVICE

RELATED APPLICATIONS

This application is the U.S. National Phase under 35 U.S.C. §371 of International Application No. PCT/JP2006/319436, filed on Sep. 29, 2006, which in turn claims the benefit of Japanese Patent Application No. JP 2005-290782, filed on Oct. 4, 2005, the disclosures of which Applications are incorporated by reference herein.

TECHNICAL FIELD

The present invention relates to a vehicle-mounted imaging device mounted in an automobile for monitoring images of the surroundings of the vehicle.

BACKGROUND ART

Conventionally, for enhancing the safety of driving of automobiles, there have been proposed a number of apparatuses in which imaging means such as video cameras are mounted in a vehicle to monitor images of the surroundings of the vehicle and various kinds of information included in the images are retrieved and used.

Such apparatuses include a system of detecting the motion of an automobile nearby from a captured image signal with an optical correlation system and alerting the driver depending on the distance and speed of the automobile, a system of searching for a given position with respect to a "road region" in a recognized image to recognize a traffic sign, a system of displaying the outputs of cameras embedded in door mirrors or side mirrors of a vehicle with an image display device placed near the driver's seat in the vehicle to allow the driver to easily check the status of an oncoming vehicle and the status of an adjacent lane, and vehicle-mounted cameras capable of taking and displaying images of right and left blind spots and vehicle downward images simultaneously.

Such vehicle-mounted cameras are required to be independent of the climate conditions. For example, to attain an imaging device independent of the climate conditions, Patent Document 1 discloses a system in which the mirror portion of each door mirror of a vehicle is composed of a half mirror and a video lens equipped with an optical filter and an imaging device such as a CCD are placed inside the door mirror, and an image signal processed with a camera signal processing circuit placed in the interior of the vehicle is outputted to an image display device.

Patent Document 1 described above argues that the disclosed configuration can solve the problems related to the camera mount position that (1) a camera placed in the interior of a vehicle may disfigure the interior resulting in degrading the comfort and narrow the vision of the driver, (2) a camera placed in an engine compartment may cause a failure because the environment is extremely bad, and (3) a camera placed outside of a vehicle, such as on the side of a door and on the engine compartment, for example, will adversely affect the safety, the design and the performance such as aerodynamic resistance.

Patent Document 1: Japanese Laid-Open Patent Publication No. 5-294183 (FIG. 1)

DISCLOSURE OF THE INVENTION

Problems to be Solved by the Invention

While the prior art described above provides the camera mount position that will not degrade the performance of a vehicle, there arise another problem of limiting the performance of a vehicle-mounted camera. That is, (1) since an image of the surroundings is taken via a half mirror, the sensitivity deteriorates, (2) since the camera is mounted inside a door mirror, the coverage of shooting is limited even though the orientation and field of view angle of the camera are adjusted suitably, and (3) since it is under consideration to remove door mirrors in future from the standpoint of design, the above prior art may fail to keep up with this trend.

Moreover, although the inside of a door mirror may be in a better use environment compared with the outside of the vehicle and the inside of the engine compartment, it is well known that the temperature becomes very high in a vehicle parked under a midsummer hot sun, including the interior of the vehicle and the inside of the door mirrors. The engine compartment will become far hotter during driving compared with the interior of the vehicle, and a camera mounted outside the vehicle will be exposed to direct sunlight. These positions therefore cause use environment-related problems.

Color filters of a conventional solid-state imaging device are made of organic pigments. When left in a high-temperature state for a long time or exposed to intense incident light for a long time, such pigments chemically change causing a change in wavelength selection characteristic. For this reason, the conventional solid-state imaging device using pigment filters has a problem of fading (degradation in color separation characteristic) due to high temperature and high radiation. This problem will be more eminent in a vehicle-mounted imaging device for the reason described above.

There are monochrome vehicle-mounted imaging devices having no color filter. However, it is needless to mention that a color imaging device is desired in the system in which a sign is recognized and the system in which an image display device is viewed described above.

In view of the above, an object of the present invention is securing high-precision color reproduction and a proper S/N of color signals without degradation due to ambient temperature and direct sunlight at whatever position of a vehicle, including outside the vehicle, in the interior of the vehicle and inside the engine compartment, a camera is mounted.

Means for Solving the Problems

The present invention is directed to a vehicle-mounted imaging device having a plurality of unit pixels arranged on a chip, including:

a photoelectric conversion element for photoelectrically converting incident light for each of the unit pixels;

a multilayer film filter placed above the photoelectric conversion element for selectively transmitting only part of wavelengths of the incident light to separate a color component; and an image processing section for performing image processing for color signals that have passed through the multilayer film filter and been photoelectrically converted, wherein the image processing section is configured to correct the color signals on a color matrix divided into a plurality of regions corresponding to the color signals, the correction being made for each of the regions.

EFFECT OF THE INVENTION

As described above, the vehicle-mounted imaging device of the present invention corrects the R (red), G (green) and B (blue) components of color signals obtained by photoelectrically converting incident light having passed the multilayer film filter on a color matrix. The color matrix is divided into a plurality of regions, and the correction is made for each of the regions. An advantageous effect can therefore be obtained in securing high-precision color reproduction.

Also, when the multilayer film filter is low in degree of modulation and thus noise is generated due to correction of color signals, noise reduction is performed. An advantageous effect can therefore be obtained in securing a proper S/N of the color signals.

DESCRIPTION OF REFERENCE NUMERALS

Figure 1:
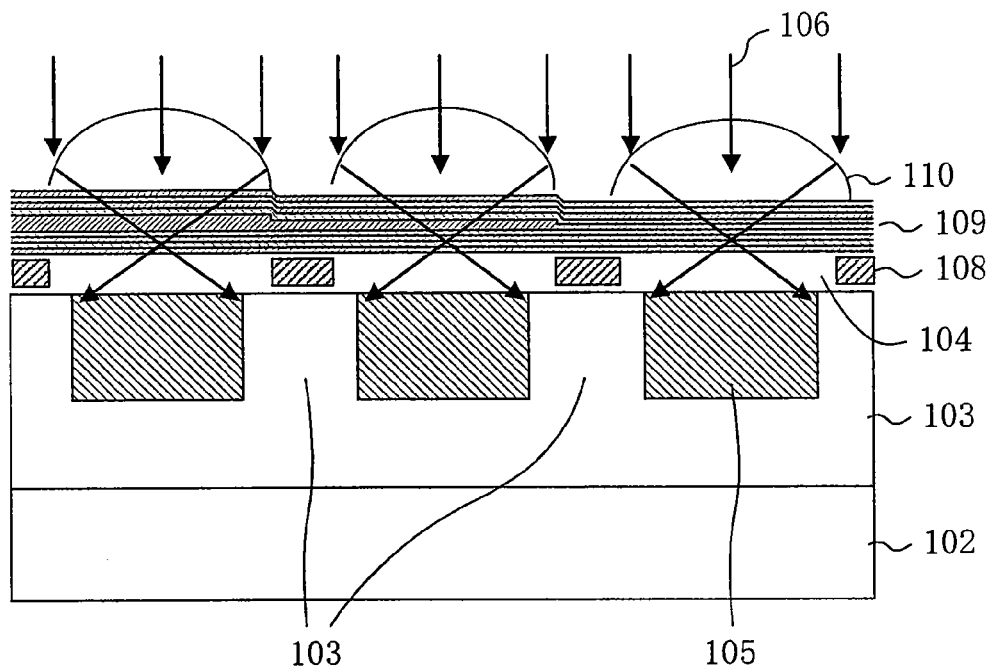
FIG. 1 is a cross-sectional view of pixel portions of a vehicle-mounted imaging device of an embodiment of the present invention.

101 Image sensor
105 Photodiode
106 Incident light
109 Multilayer film filter
201 Automobile
402 Image processing LSI
404 Color signal processing section
405 Multi-axis color difference MTX portion
406 Noise reduction portion

BEST MODE FOR CARRYING OUT THE INVENTION

Hereinafter, an embodiment of the present invention will be described with reference to the relevant drawings. It should be noted that the following description of a preferred embodiment is essentially a mere illustration and by no means meant to limit the present invention, its applications or its uses.

FIG. 1 is a cross-sectional view showing three pixel portions of a vehicle-mounted imaging device of the present invention. As shown in FIG. 1, an image sensor 101 of the vehicle-mounted imaging device includes a silicon semiconductor substrate having an n-type layer 102 and a p-type layer 103 formed on the n-type layer 102. An interlayer insulating film 104 is formed on the silicon semiconductor substrate.

In the p-type layer 103, a plurality of photodiodes (photoelectric conversion elements) 105 are formed by ion implantation of n-type impurities, to photoelectrically convert incident light 106. The respective photodiodes 105 are isolated from one another with element isolation regions 107.

Light-shading films 108 for suppressing incidence of light are formed over the element isolation regions 107. Over the light-shading films 108, multilayer film filters 109 made of dielectrics are formed for achieving a wavelength selection function. Converging lenses 110 are formed over the multilayer film filters 109 for condensing the incident light 106 efficiently.

Figure 2:
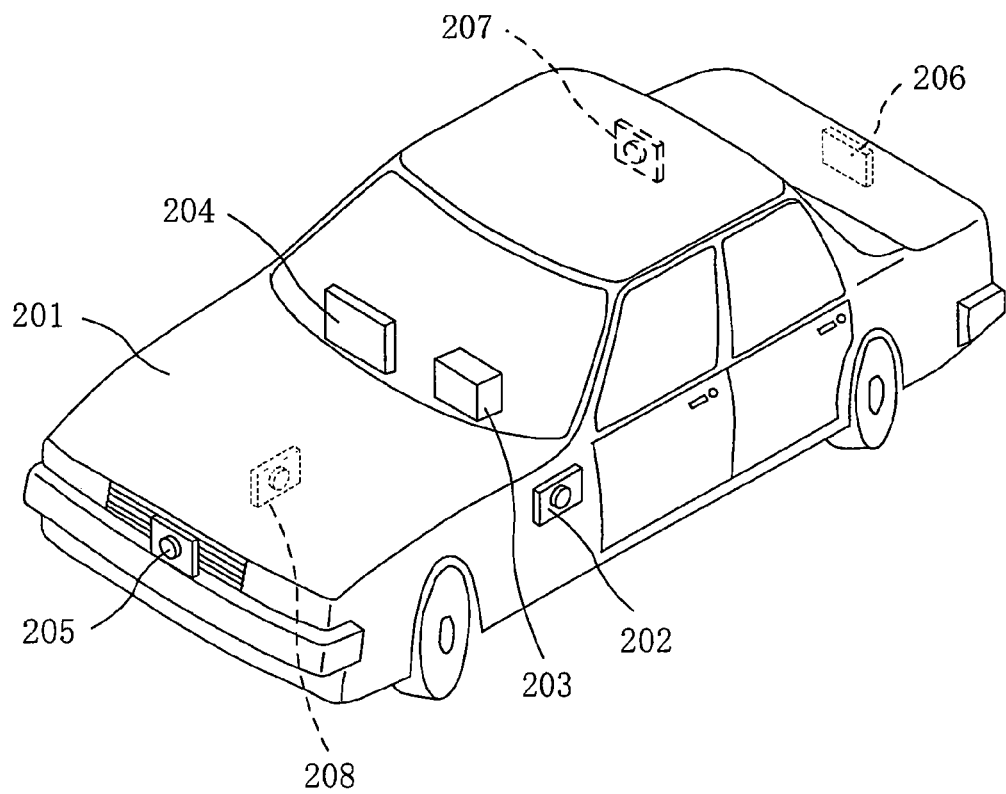
FIG. 2 is a view showing installation of the vehicle-mounted imaging device of this embodiment in an automobile.

FIG. 2 is a view illustrating the installation of the vehicle-mounted imaging device of this embodiment in an automobile. As shown in FIG. 2, an automobile 201 has no fender mirror or door mirror from the standpoint of design, and instead has a side camera 202 placed on each side thereof. A video signal from the side camera 202 is inputted into a video control device 203 placed in the console, and an output signal from the video control device 203 is displayed on a video display device 204 placed near the driver's seat inside the automobile.

The video control device 203 also receives output signals from a front camera 205 placed on the front of the vehicle, a rear camera 206 placed on the rear of the vehicle, a camera 207 in the interior of the vehicle and a camera 208 in the engine compartment, and can display the video signals from the side cameras 202, the front camera 205 and the rear camera 206 on the video display device 204 by switching or simultaneously. The video control device 203 can also perform measurement of the distance from a vehicle ahead, a vehicle behind or an adjacent vehicle, detection of an obstacle and the like by processing the video signals, to alert the driver.

The video signal from the camera 207 in the interior is used to detect dozing and drunk driving by analyzing the operation of the driver, and also used for alarming and video recording against theft by being operated during parking.

The camera 208 in the engine compartment is used to monitor the engine, the transmission, the suspension, the tires and the like.

Utilizing the feature that cameras in the interior and the engine compartment are more likely to be protected at an accident such as a crash compared with those outside the vehicle, the camera 207 in the interior and the camera 208 in the engine compartment may be used for monitoring of the surroundings. These cameras will especially be effective if being used as a vehicle-mounted black box that records images at a traffic accident before and after a crash if any.

Although not shown in FIG. 2, the vehicle-mounted imaging device shown in FIG. 1 is incorporated in each of the side cameras 202, the front camera 205, the rear camera 206, the camera 207 in the interior and the camera 208 in the engine compartment.

Hereinafter, the transmittance characteristic of the multilayer film filter in this embodiment will be described in comparison with the transmittance characteristic of a conventional multilayer film filter.

Figure 3A:
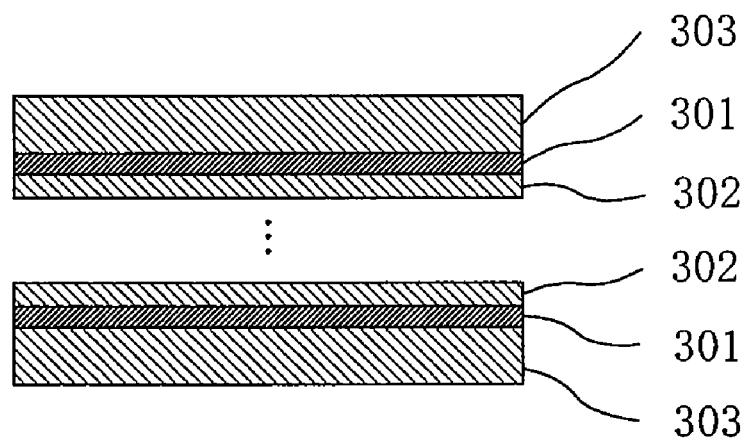
FIG. 3(a) is a view showing a layered structure of a conventional multilayer film filter.
Figure 3B:
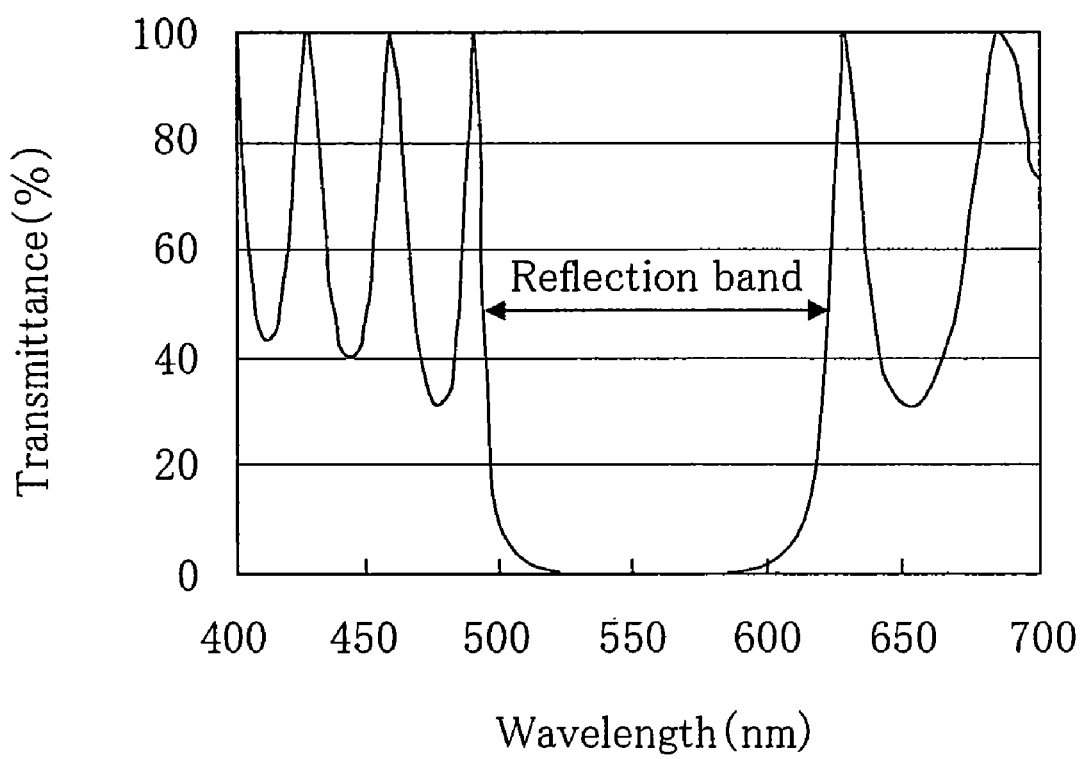
FIG. 3(b) is a view showing the transmittance characteristic of the conventional multilayer film filter.

FIG. 3(a) is a view showing the layered structure of a multilayer film filter that is a multilayer film reflector used as a conventional high-reflection mirror, and FIG. 3(b) is a view showing the transmittance characteristic of the conventional multilayer film filter.

As shown in FIG. 3(a), the multilayer film filter has a layered structure of simply stacking silicon nitride (SiN) 301 and silicon oxide ($SiO_2$) 302 and 303, which are materials different in refractive index, one upon another.

In FIG. 3(b), the y axis represents the light transmittance as the ratio of light having passed through the multilayer film to incident light, and the x axis represents the wavelength of light incident on the multilayer film. Note that calculation was made adopting a matrix method using a Fresnel coefficient, where the number of pairs was 10, the set center wavelength was 550 nm, and only vertically incident light was used.

The optical thickness nd (n: refractive index of material, d: film thickness of material) of each of the dielectrics constituting the multilayer film is set to be based on a quarter ($\lambda/4$) of the set center wavelength $\lambda$. As a result, a reflection band characteristic with the set center wavelength as the center is exhibited. The reflection bandwidth is determined with the difference in refractive index between the materials used, where as the difference in refractive index is greater, the bandwidth is greater.

With the layered structure described above, a wide anti-reflection band is obtained. However, it will be difficult to transmit wavelengths selectively for the R/G/B color separation function.

Figure 4A:
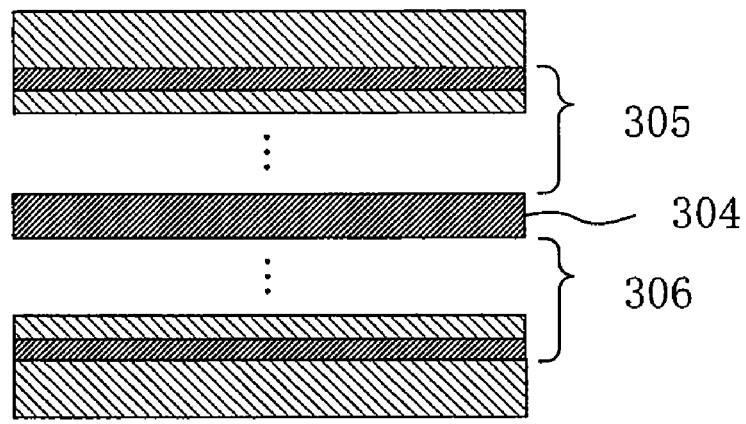
FIG. 4(a) is a view showing a layered structure of a multilayer film filter in this embodiment.
Figure 4B:
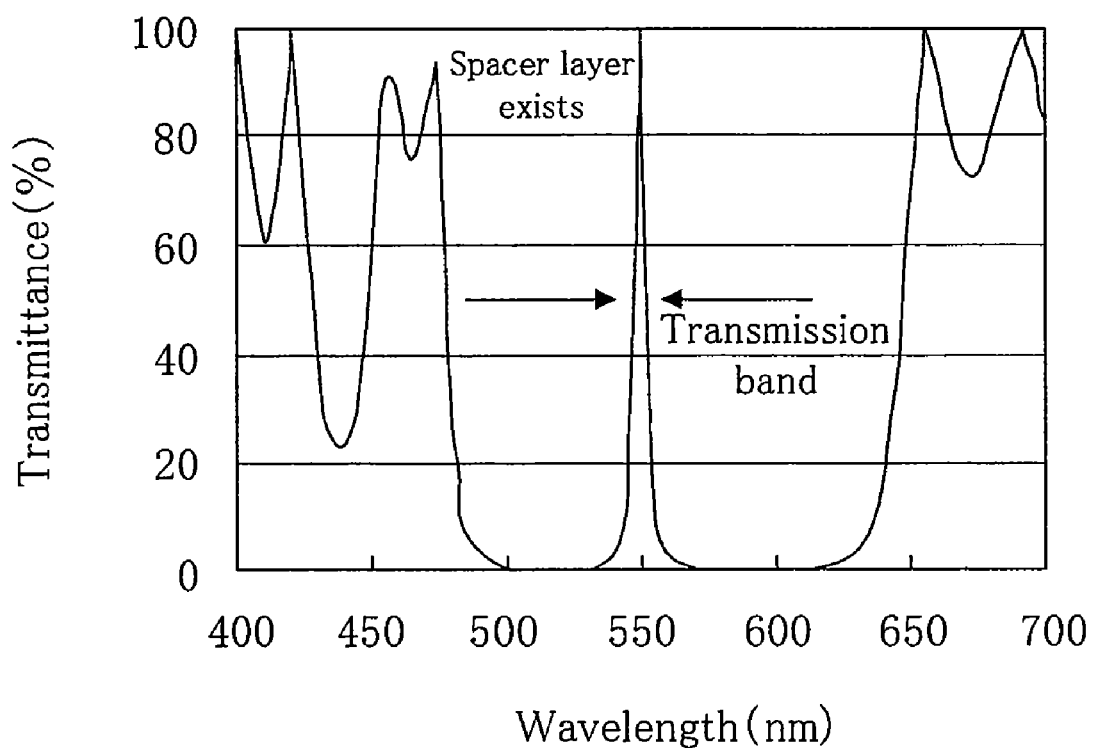
FIG. 4(b) is a view showing the transmittance characteristic of the multilayer film filter in this embodiment.

FIG. 4(a) is a view showing the layered structure of the multilayer film filter that is a color separation mirror used as a high-reflection mirror in this embodiment, and FIG. 4(b) is a view showing the transmittance characteristic of the multilayer film filter in this embodiment.

As shown in FIG. 4(a), the multilayer film filter in this embodiment of the present invention is configured so that an upper reflector 305 and a lower reflector 306 both having a $\lambda/4$ multilayer film structure ($\lambda$: set center wavelength) are symmetric with respect to a spacer layer 304 as the center. Having such a layered structure, a transmission band region is selectively formed in a reflection band, and moreover the transmission peak wavelength can be changed by changing the thickness of the spacer layer 304.

The dielectric multilayer film filter according to the present invention, which can be made of only inorganic materials, is free from a fading phenomenon even being used under high-temperature, high-irradiation circumstances. Therefore, the inventive multilayer film filter can be used in vehicle-mounted applications to be mounted anywhere including outside a vehicle, in an engine compartment and in the interior of a vehicle.

Figure 5:
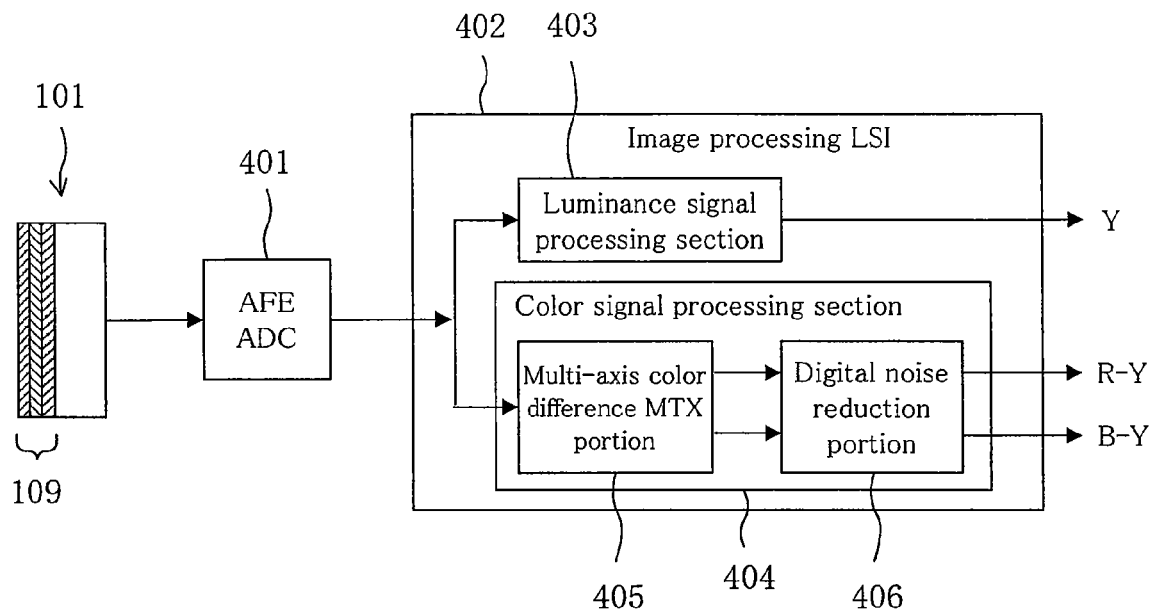
FIG. 5 is a view showing the entire configuration of the vehicle-mounted imaging device of this embodiment.

FIG. 5 is a view showing the entire configuration of the vehicle-mounted imaging device of this embodiment. Referring to FIG. 5, the reference numeral 101 denotes an image sensor, 109 denotes a multilayer film filter made of inorganic materials stacked one upon another, and 401 denotes an AFE (analog front end) for analog-processing the output signal from the image sensor 101 and an ADC (AD converter) for converting the analog signal to a digital signal.

The reference numeral 402 denotes an image processing LSI for processing the digitized output signal from the image sensor 101 to generate desired image data.

The reference numeral 403 denotes a luminance signal processing section for generating a luminance signal Y from the output signal from the image sensor 101 and outputs the resultant signal.

The reference numeral 404 denotes a color signal processing section that includes a multi-axis color difference MTX portion 405 for correcting color signals on a color matrix and a digital noise reduction portion 406 for reducing noise.

In the color signal processing section 404, color difference signals R−Y and B−Y are calculated from R (red), G (green) and B (blue) components, in which Y represents the luminance signal satisfying Y=0.59R+0.3G+0.11B. An output image is produced using the color difference signals R−Y and B−Y obtained in the color signal processing section 404 and the luminance signal Y.

As described above, by performing color correction and noise reduction in the color signal processing section 404, high-precision color reproduction and a proper S/N of color signals can be secured.

Figure 6:
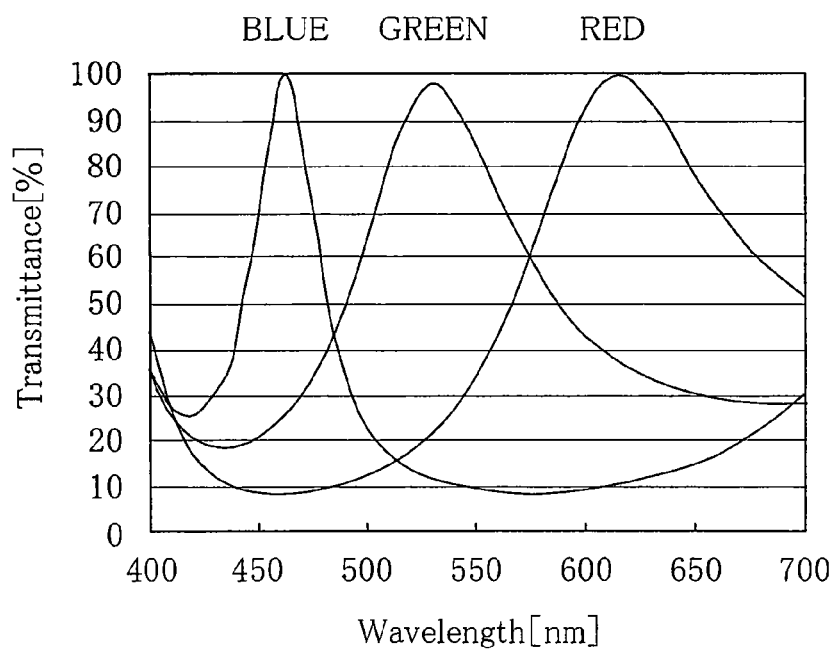
FIG. 6 is a view showing the ideal spectral characteristics of a dielectric multilayer film filter.
Figure 7:
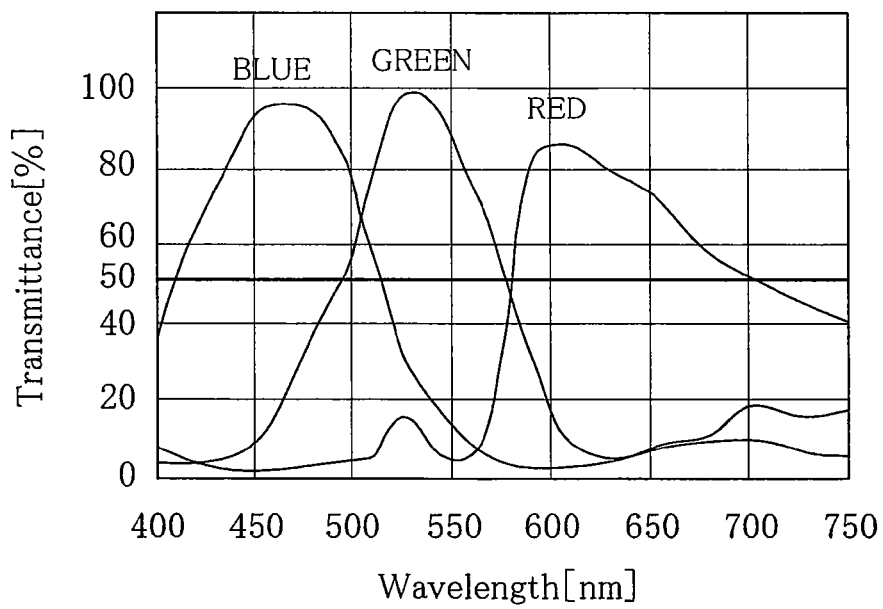
FIG. 7 is a view showing the spectral characteristics of the dielectric multilayer film filter in the vehicle-mounted imaging device of this embodiment.

FIG. 6 is a view showing the ideal spectral characteristics of a dielectric multilayer film filter, and FIG. 7 is a view showing the spectral characteristics of the dielectric multilayer film filter in the vehicle-mounted imaging device of this embodiment.

As shown in FIG. 7, it is found that the dielectric multilayer film filter in this embodiment, which is poor in spectral characteristics and low in degree of modulation, falls short of securing ideal color reproduction and a proper S/N of color signals as shown in FIG. 6. It is therefore necessary to subject the output signal from the multilayer film filter to image processing in the image processing LSI 402.

Hereinafter, a correction procedure for color signals according to the present invention will be described in comparison with a conventional correction procedure for color signals. First, the conventional correction procedure for color signals will be described.

Figure 8:
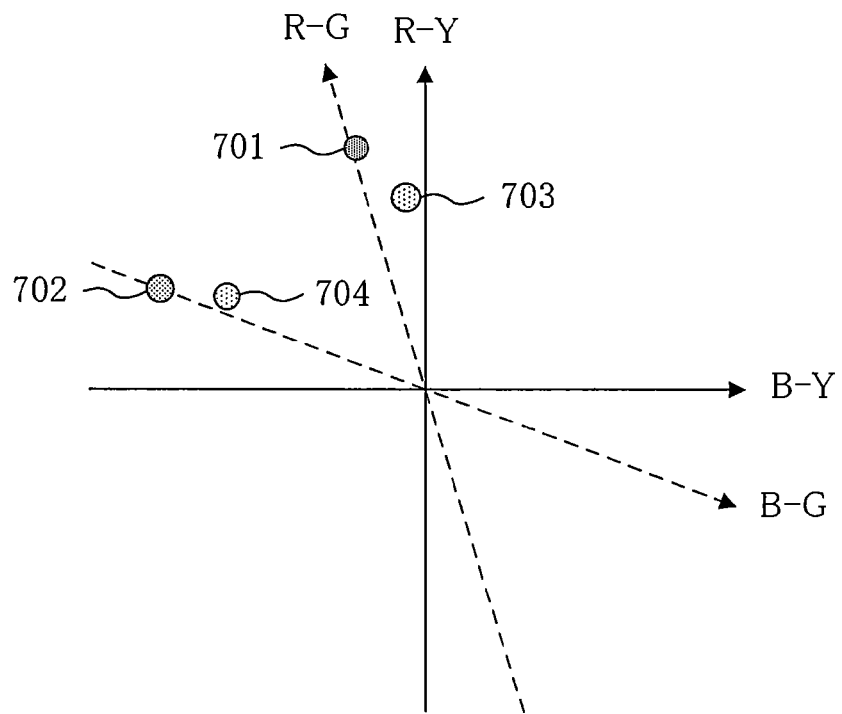
FIG. 8 is a diagrammatic view showing coordinates before correction on a conventional color matrix.

FIG. 8 is a diagrammatic view showing the coordinates of color signals before correction on a conventional color matrix, in which the coordinates 701 of ideal red, the coordinates 702 of ideal yellow and the coordinates of color signals (coordinates 703 of red and coordinates 704 of yellow) obtained by subjecting red and yellow objects to color separation with a dielectric multilayer film filter and then photoelectric conversion are shown.

Figure 9:
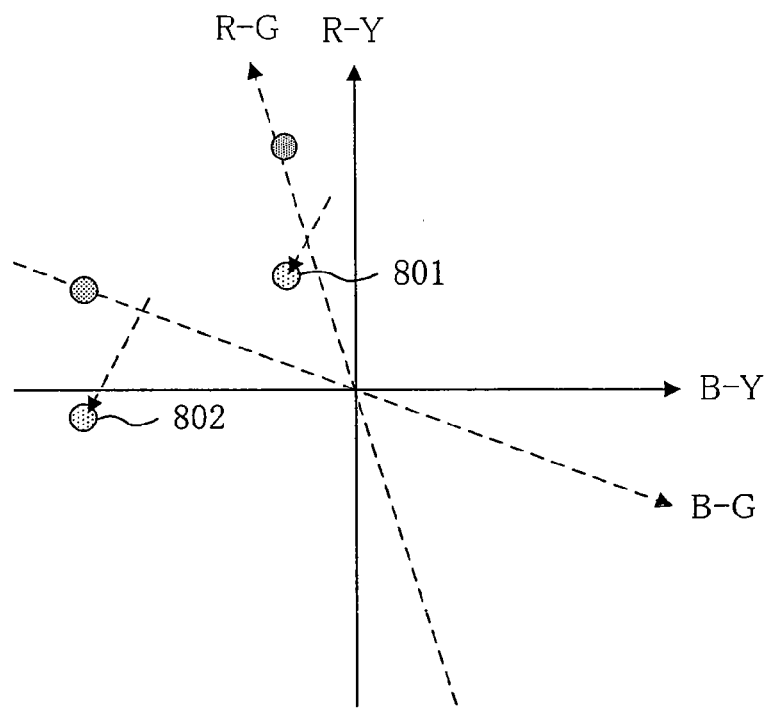
FIG. 9 is a diagrammatic view showing coordinates after correction on the conventional color matrix.

Correction for the coordinates 703 of red and the coordinates 704 of yellow is made using Equations (1) and (2) below. FIG. 9 is a diagrammatic view showing the coordinates obtained after the correction with Equations (1) and (2).

$$R-Y=(R-G)-n(B-G) (n \text{ is any given integer}) \quad (1)$$

$$B-Y=(B-G)-m(R-G) (m \text{ is any given integer}) \quad (2)$$

In Equation (1), in calculation of the color difference signal (R−Y), the difference between the B component and the G component (B−G) is multiplied by the constant n to correct the color difference signal (R−Y). Likewise, in Equation (2), in calculation of the color difference signal (B−Y), the difference between the R component and the G component (B−G) is multiplied by the constant m to correct the color difference signal (B−Y).

Figure 10:
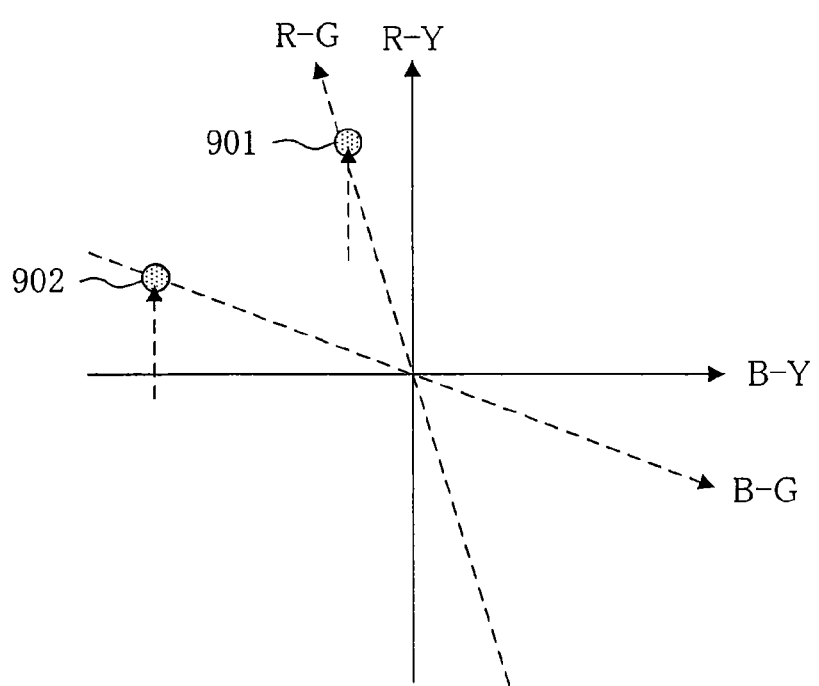
FIG. 10 is a diagrammatic view showing coordinates after final correction on the conventional color matrix.

Correction is then performed for the coordinates 801 of red and the coordinates 802 of yellow in FIG. 9 using Equations (3) and (4) below. FIG. 10 is a diagrammatic view showing the coordinates obtained after the correction with Equations (3) and (4).

$$(R-Y)'=s(R-Y) (s \text{ is any given integer}) \quad (3)$$

$$(B-Y)'=t(B-Y) (t \text{ is any given integer}) \quad (4)$$

In Equation (3), the color difference signal (R−Y) obtained from Equation (1) is multiplied by the constant s to correct the color difference signal (R−Y). Likewise, in Equation (4), the color difference signal (B−Y) obtained from Equation (2) is multiplied by the constant t to correct the color difference signal (B−Y).

Figure 11:
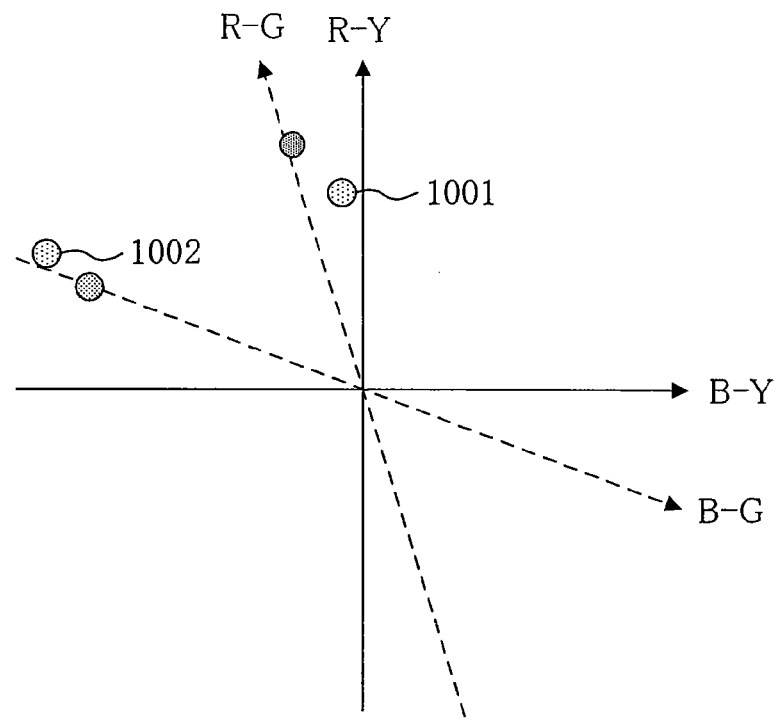
FIG. 11 is another diagrammatic view showing coordinates before correction on the conventional color matrix.
Figure 12:
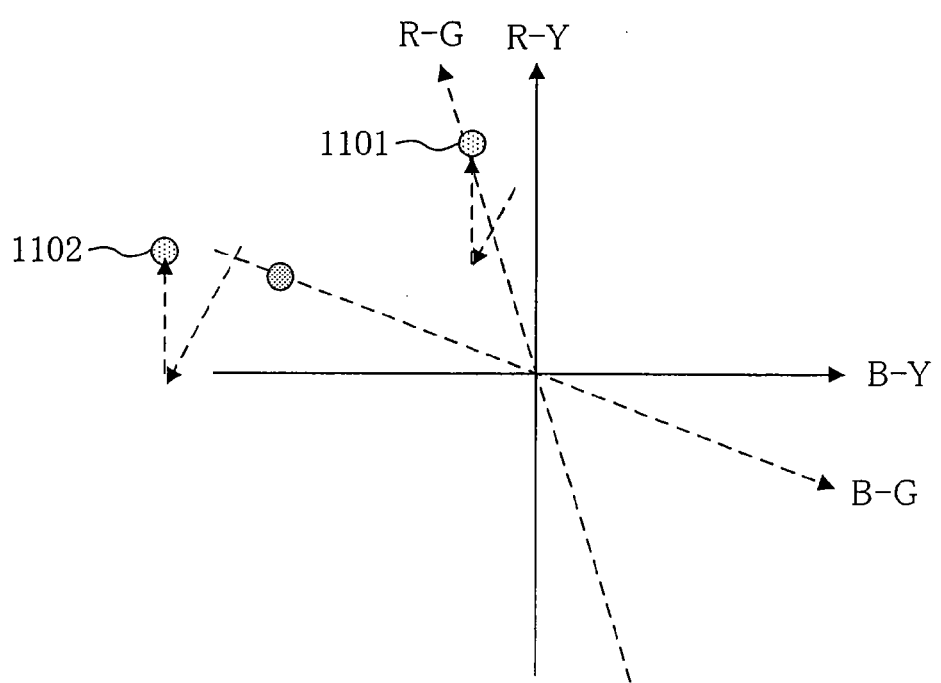
FIG. 12 is another diagrammatic view showing coordinates after final correction on the conventional color matrix.

As described above, in the conventional correction procedure for color signals, correction is made so that the coordinates 703 of red and the coordinates 704 of yellow overlap the respective ideal coordinates 701 and 702 of red and yellow. However, if the coordinates of the color signals before correction are as shown in FIG. 11 (coordinates 1001 of read and coordinates 1002 of yellow), for example, the coordinates 1002 of yellow will be widely deviated from the ideal coordinates 702 as shown in FIG. 12 when the color signals are corrected using Equations (1) to (4) above, failing to exhibit good color reproduction.

Figure 13:
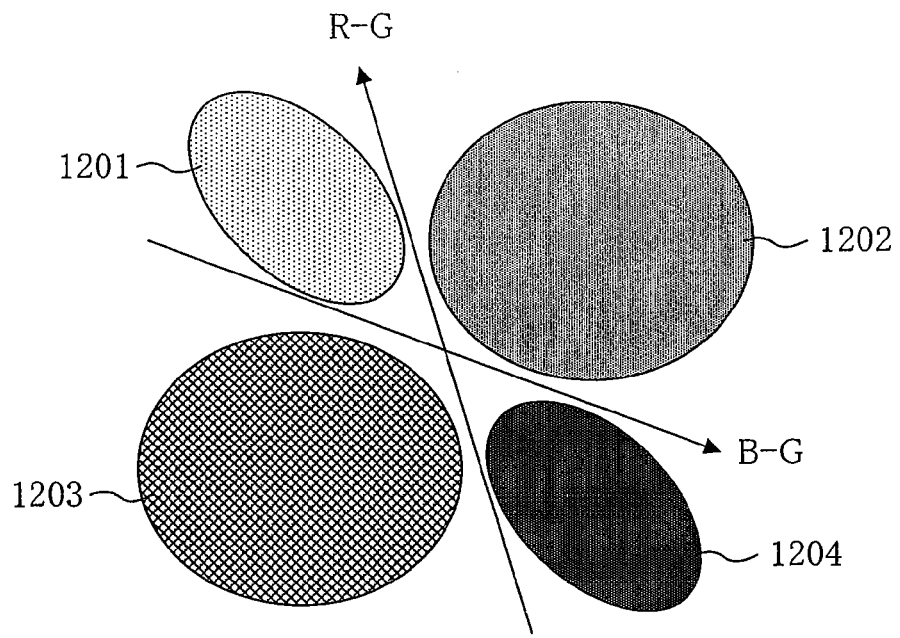
FIG. 13 is a diagrammatic view showing four regions on a color matrix made of the R–G axis and the B–G axis in this embodiment.

Hereinafter, the correction procedure for color signals according to the present invention will be described. FIG. 13 is a diagrammatic view showing four divided regions on a color matrix made of the R−G axis and the B−G axis.

The coordinates 1001 of red and the coordinates 1002 of yellow in FIG. 10, of which correction failed in the conventional correction procedure described above, are corrected using Equations (5) to (8).

$$R-Y=(R-G)-n_1(B-G) (n_1 \text{ is any given integer}, B-G>0) \quad (5)$$

$$R-Y=(R-G)-n_2(B-G) (n_2 \text{ is any given integer}, B-G<0) \quad (6)$$

$$B-Y=(B-G)-m_1(R-G) (m_1 \text{ is any given integer}, R-G>0) \quad (7)$$

$$B-Y=(B-G)-m_2(R-G) (m_2 \text{ is any given integer}, R-G<0) \quad (8)$$

Equations (5) to (8) indicate that correction is made for regions 1201 to 1204 individually.

Figure 14:
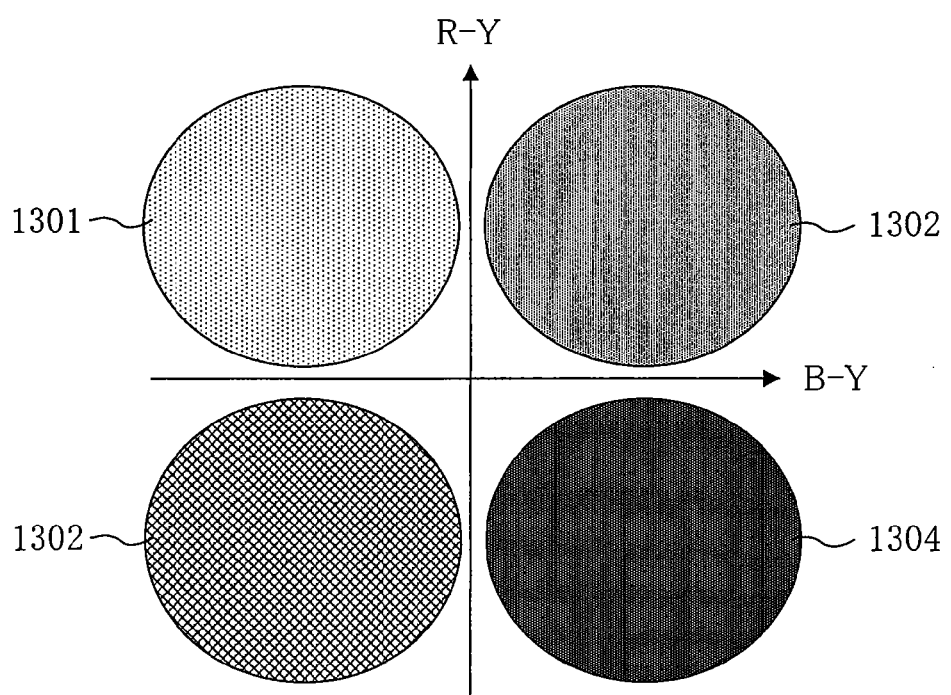
FIG. 14 is a diagrammatic view showing four regions on a color matrix made of the R–Y axis and the B–Y axis in this embodiment.

FIG. 14 is a diagrammatic view showing four divided regions on a color matrix made of the R−Y axis and the B−Y axis.

Like the correction described above, the coordinates 1001 of red and the coordinates 1002 of yellow in FIG. 10 are corrected using Equations (9) to (12).

$$(R-Y)'=s_1(R-Y) (s_1 \text{ is any given integer}, R-Y>0) \quad (9)$$

$$(R-Y)'=s_2(R-Y) (s_2 \text{ is any given integer}, R-Y<0) \quad (10)$$

$$(B-Y)'=t_1(B-Y) (t_1 \text{ is any given integer}, B-Y>0) \quad (11)$$

$$(B-Y)'=t_2(B-Y) (t_2 \text{ is any given integer}, B-Y<0) \quad (12)$$

Equations (9) to (12) indicate that correction is made for regions 1301 to 1304 individually.

Figure 15:
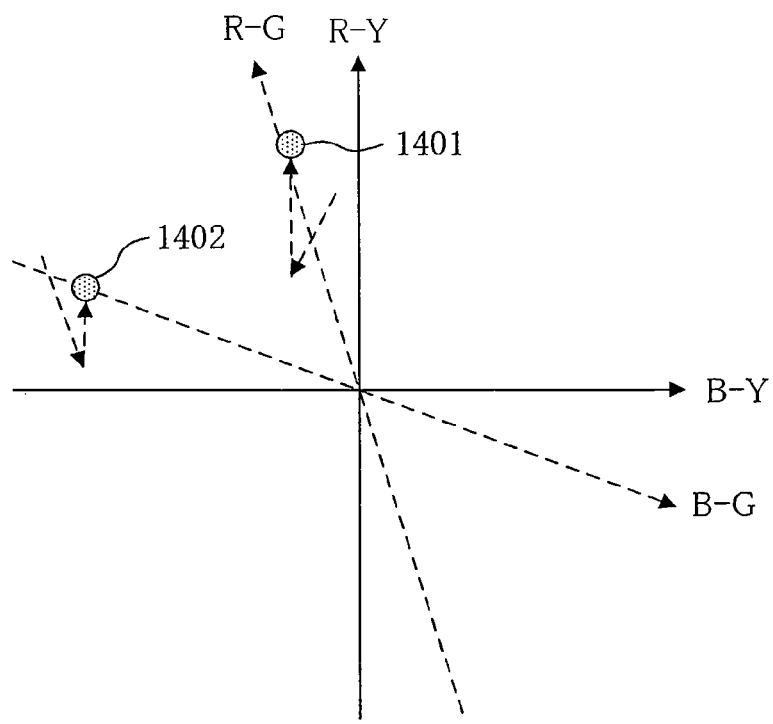
FIG. 15 is a diagrammatic view showing coordinates after correction on the color matrix in this embodiment.

By performing the correction described above, the coordinates 1001 of red and the coordinates 1002 of yellow respectively overlap the ideal coordinates 701 of red and the ideal coordinates 702 of yellow as shown in FIG. 15, permitting high-precision color reproduction.

In Equations (5) to (12) above, the color matrix made of the R−G axis and the B−G axis was divided into four regions and the color matrix made of the R−Y axis and the B−Y axis was divided into four regions. The present invention is not limited to this division, but higher-precision color reproduction can be attained by increasing the number of divided regions.

The coefficients such as n, m, s and t are preferably set considering the positional relationship between the ideal coordinates of color signals and the coordinates of the color signals obtained after the color separation with the multilayer film filter and the photoelectric conversion.

Since the dielectric multilayer film filter is low in degree of modulation, the correction on a color matrix may be made to a large extent, causing a problem of eminently degrading the S/N of color signals.

To address the above problem, in the vehicle-mounted imaging device of this embodiment of the present invention, a color signal eminent in S/N degradation is subjected to strong noise reduction. Such noise reduction is performed using the absolute values of the differences in color signal between a pixel 1501 and eight surrounding pixels 1502 to 1509 shown in FIG. 16 and a correction threshold 1601 and a correction function value 1602 shown in FIG. 17 (where 0≦correction threshold≦correction function value).

Figure 16:
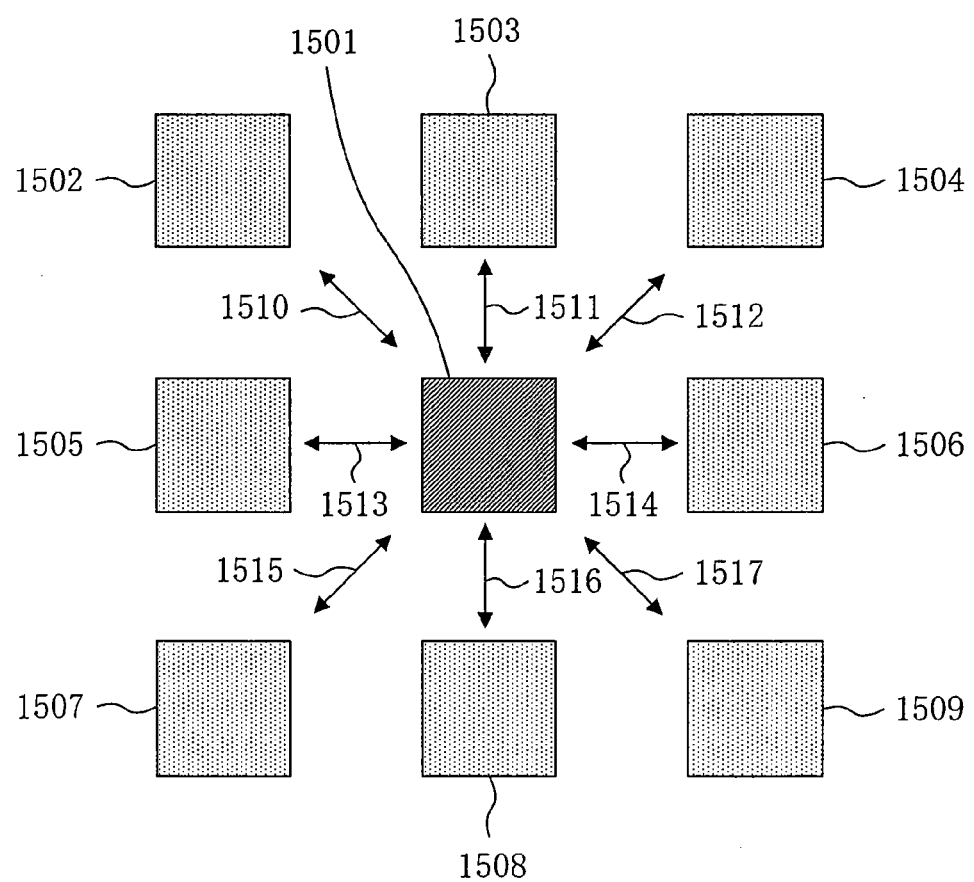
FIG. 16 is a diagrammatic view showing pixel portions of the vehicle-mounted imaging device of this embodiment.

Specifically, assuming that the values of the color signal (R−Y)' in the pixels 1501 to 1509 shown in FIG. 16 are respectively 15, 25, 26, 40, 24, 45, 23, 27 and 50, the absolute values 1510 to 1507 of the differences in color signal (R−Y)' between the pixel 1501 and the eight surrounding pixels 1502 to 1509 are respectively 10, 11, 25, 9, 30, 8, 12 and 35.

Figure 17:
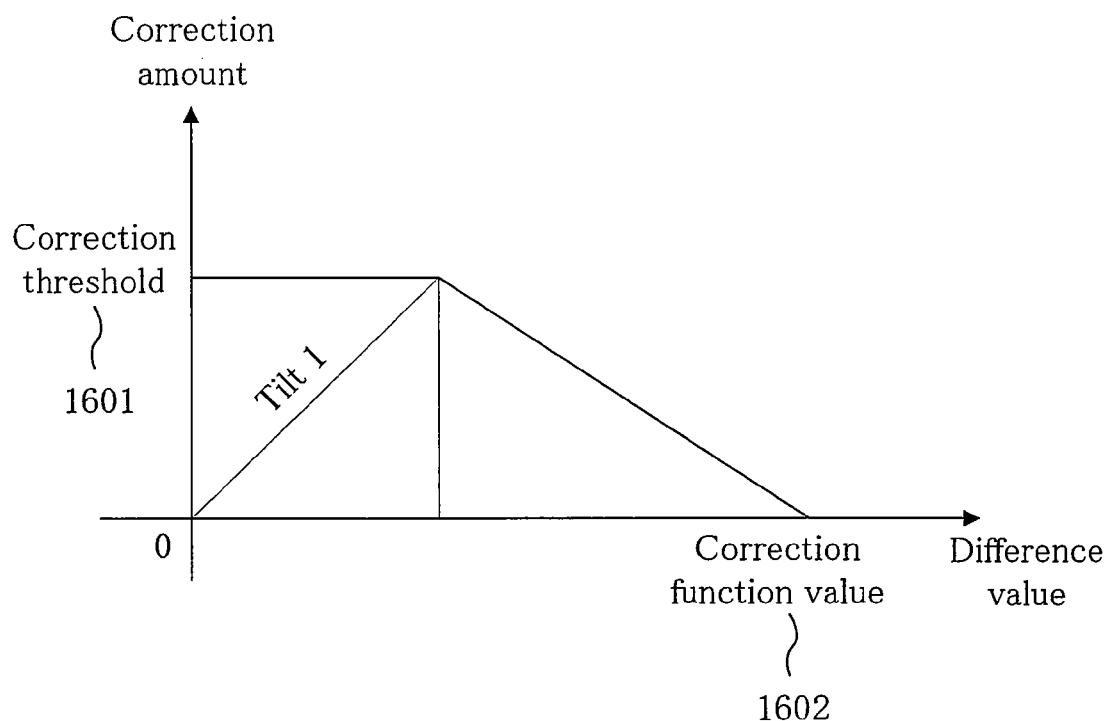
FIG. 17 is a diagrammatic view showing a correction threshold and a correction function value in noise reduction in this embodiment.

Also assuming that the correction threshold 1601 and the correction function value 1602 shown in FIG. 17 are respectively "8" and "12", there are five absolute values of the differences in color signal (R−Y)' that are equal to or less than the correction function value 1602, that is, the absolute values 1510, 1511, 1513, 1505 and 1506, and the average value of these absolute values is "10".

Figure 18:
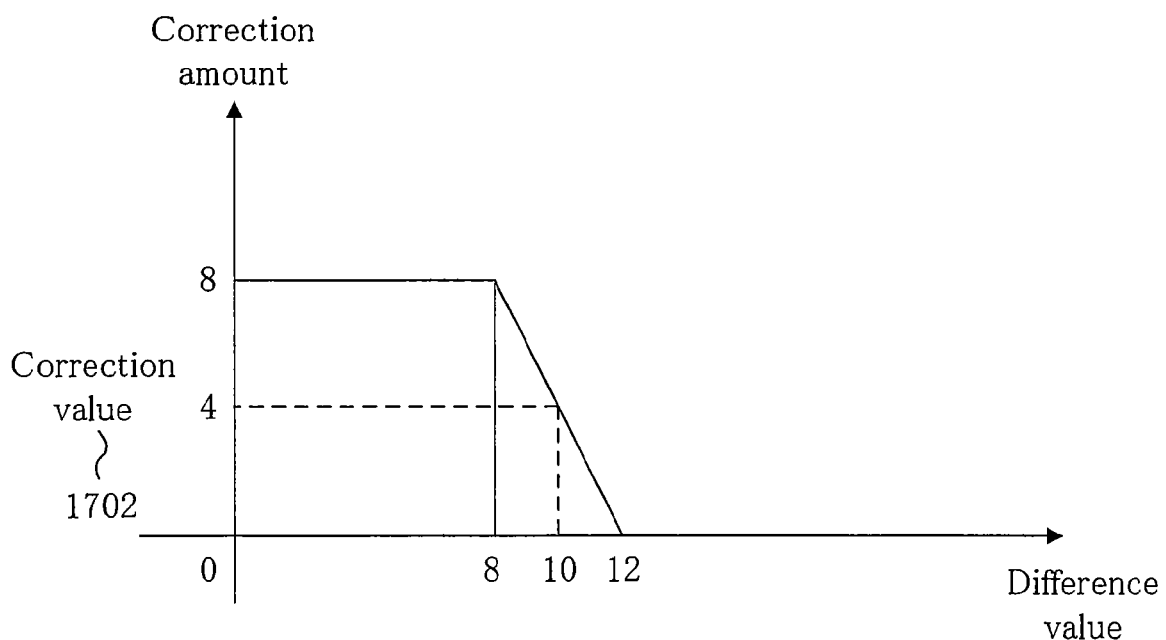
FIG. 18 is a diagrammatic view showing a correction value in the noise reduction in this embodiment.

As shown in FIG. 18, the average value "10" of the absolute values 1510, 1511, 1513, 1505 and 1506 of the differences is less than the correction function value 1602, and the correction value 1702 thereof is "4". In other words, the color signal (R−Y)' in the pixel 1501 is corrected to 15+4=19. Likewise, correction is made also for the color signal (B−Y)'.

Although the correction threshold 1601 was set at "8" and the correction function value 1602 at "12" in this embodiment, the present invention is not limited to this setting. For example, if the degree of modulation of the dielectric multilayer film filter is so low that the correction on a color matrix is made to a large extent causing eminent degradation in the S/N of the color signal, large values such as "12" for the correction threshold 1601 and "16" for the correction function value 1602 may be set to perform strong noise reduction to thereby prevent degradation in the S/N of the color signal.

Figure 19:
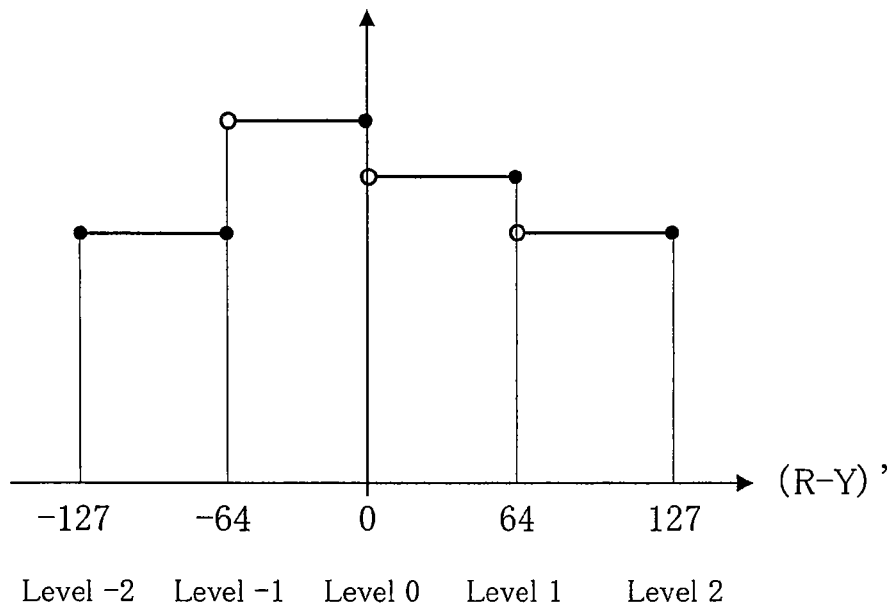
FIG. 19 is a diagrammatic view showing the setting of a correction threshold for each level of a color signal (R–Y)' in the noise reduction in this embodiment.
Figure 20:
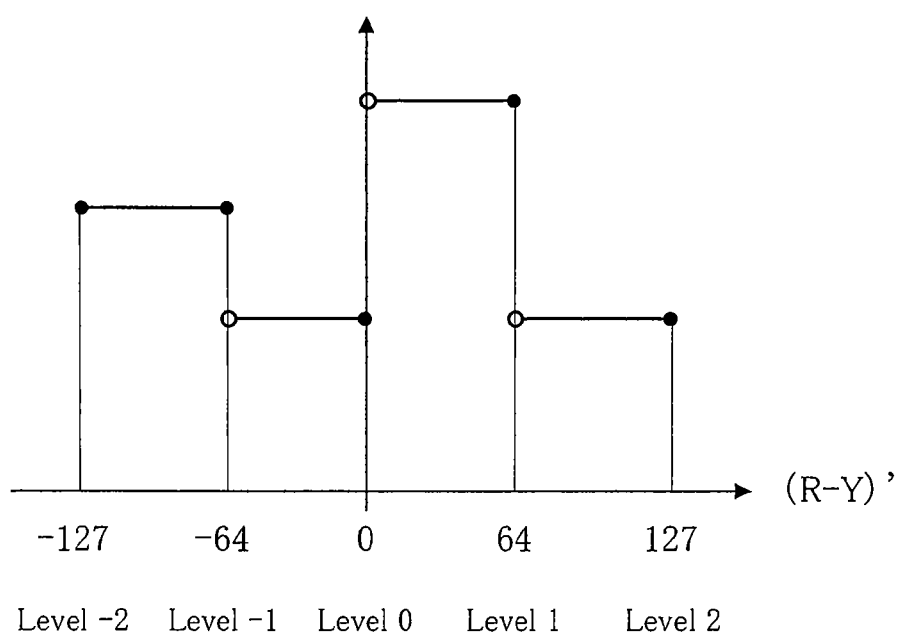
FIG. 20 is a diagrammatic view showing the setting of a correction function value for each level of the color signal (R–Y)' in the noise reduction in this embodiment.

The correction threshold 1601 and the correction function value 1602 may be set for each level of a color signal as shown in FIGS. 19 and 20, so that the strength of the noise reduction can be changed with the level of the color signal. It is therefore possible to perform noise reduction along with the extent of the correction of the color signal on a color matrix.

Note that in the example of pixel portions shown in FIG. 16, the noise reduction was performed by calculating the absolute values of the differences in color signal using the eight surrounding pixels. The present invention is not limited to this example. By increasing the number of surrounding pixels used for calculation of the absolute values of the differences in color signal, it is possible to perform noise reduction considering the color signal in pixels in a wider range. This is advantageous in further preventing degradation in the S/N of the color signal.

INDUSTRIAL APPLICABILITY

As described above, the present invention, which can provide a highly practical effect that high-precision color reproduction and a proper S/N of color signals can be secured without deterioration due to ambient temperature or direct sunlight, is very useful and high in industrial applicability. In particular, the present invention is usable as a vehicle-mounted imaging device mounted in an automobile for monitoring images of the surroundings of the automobile.

The invention claimed is:

1. A vehicle-mounted imaging device having a plurality of unit pixels arranged on a chip, comprising:
   a photoelectric conversion element for photoelectrically converting incident light for each of the unit pixels;
   a multilayer film filter placed above the photoelectric conversion element for selectively transmitting only part of wavelengths of the incident light to separate a color component; and
   an image processing section for performing image processing for color signals that have passed through the multilayer film filter and been photoelectrically converted,
   wherein the image processing section is configured to correct the color signals on a color matrix divided into a plurality of regions corresponding to the color signals, the correction being made for each of the regions.

2. The vehicle-mounted imaging device of claim 1, wherein the image processing section is configured to correct the color signals by multiplying the color signals by constants different among the color signals in the respective regions.

3. The vehicle-mounted imaging device of claim 1, wherein the regions corresponding to the color signals comprises at least four regions.

4. The vehicle-mounted imaging device of claim 1, wherein the image processing section is configured to calculate the difference in color signal between a specific unit pixel and a pixel surrounding the specific unit pixel, compare the calculation result with a preset threshold and perform noise reduction based on the comparison result.

5. The vehicle-mounted imaging device of claim 4, wherein the image processing section is configured so that the strength of the noise reduction is adjusted with a change in setting of the threshold.

6. The vehicle-mounted imaging device of claim 4, wherein different thresholds are set among levels of the color signal.

7. The vehicle-mounted imaging device of claim 4, wherein the image processing section is configured to calculate the differences in color signal between the specific unit pixel and at least eight surrounding pixels.

* * * * *